(12) United States Patent
Lee et al.

(10) Patent No.: US 7,074,260 B2
(45) Date of Patent: Jul. 11, 2006

(54) FILTER USING CARBON NANOTUBE

(75) Inventors: Jai-Kwon Lee, Suwon (KR); Young-Saeng Kim, Incheon (KR); Chan-Jung Park, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 261 days.

(21) Appl. No.: 10/672,064

(22) Filed: Sep. 29, 2003

(65) Prior Publication Data

US 2004/0131811 A1    Jul. 8, 2004

(30) Foreign Application Priority Data

Dec. 23, 2002    (KR) .................. 10-2002-0082683

(51) Int. Cl.
*B01D 53/04*    (2006.01)

(52) U.S. Cl. ................... 96/108; 96/153; 55/527; 55/DIG. 5

(58) Field of Classification Search ............... 95/143, 95/144, 147, 900, 901; 96/108, 130, 135, 96/153, 154, 134; 55/524, 527, 528, DIG. 5

See application file for complete search history.

(56) References Cited

U.S. PATENT DOCUMENTS

| | | | | |
|---|---|---|---|---|
| 3,955,944 A * | 5/1976 | Grant | ................ | 95/143 |
| 4,663,230 A * | 5/1987 | Tennent | ................ | 428/367 |
| 5,165,909 A * | 11/1992 | Tennent et al. | ................ | 423/447.3 |
| 5,626,650 A * | 5/1997 | Rodriguez et al. | ................ | 95/116 |
| 6,093,236 A * | 7/2000 | Klabunde et al. | ................ | 95/128 |
| 6,171,684 B1 * | 1/2001 | Kahlbaugh et al. | ................ | 428/212 |
| 6,309,449 B1 * | 10/2001 | Klos et al. | ................ | 96/108 |
| 6,723,157 B1 * | 4/2004 | Tsuda et al. | ................ | 96/101 |
| 2002/0020292 A1 * | 2/2002 | Wojtowicz et al. | ................ | 95/116 |
| 2002/0192142 A1 * | 12/2002 | Tillotson et al. | ................ | 423/447.1 |
| 2003/0089237 A1 * | 5/2003 | Jagtoyen et al. | ................ | 96/108 |
| 2003/0140785 A1 * | 7/2003 | Koslow | ................ | 95/90 |
| 2003/0177909 A1 * | 9/2003 | Koslow | ................ | 96/154 |
| 2003/0196549 A1 * | 10/2003 | Rohrbach et al. | ................ | 95/90 |
| 2003/0226443 A1 * | 12/2003 | Rajagopalan et al. | ................ | 95/133 |
| 2004/0112214 A1 * | 6/2004 | Graham | ................ | 95/136 |
| 2004/0237790 A1 * | 12/2004 | von Blucher et al. | ................ | 96/154 |
| 2005/0061685 A1 * | 3/2005 | Struthers et al. | ................ | 206/0.7 |

OTHER PUBLICATIONS

Patent Abstracts of Japan 11-221414 dated Aug. 17, 1999.
Patent Abstracts of Japan 11-349423 dated Dec. 21, 1999.

\* cited by examiner

*Primary Examiner*—Robert H. Spitzer
(74) *Attorney, Agent, or Firm*—Staas & Halsey LLP

(57) ABSTRACT

A filter for an air conditioner, including a carbon nanotube, wherein nano-sized metal particles of at least one type of metal are deposited into the carbon nanotube.

31 Claims, 10 Drawing Sheets diamond

C₆₀
"buckminsterfullerene"

graphite (10,10) tube

Chromatogram for 1.04μg of standard solution blank

After duration of 5 min

After duration of 4 hrs

Deodorizing filter using carbon nanotubes

After duration of 5 min

After duration of 4 hrs

Deodorizing filter using activated carbons

After duration of 5 min

After duration of 4 hrs

FILTER USING CARBON NANOTUBE

CROSS-REFERENCE TO RELATED APPLICATIONS

This application claims the benefit of Korean Patent Application No. 2002-82683, filed Dec. 23, 2002, in the Korean Intellectual Property Office, the disclosure of which is incorporated herein by reference.

BACKGROUND OF THE INVENTION

1. Field of the Invention

The present invention relates, in general, to filters for use in air conditioners and, more particularly, to a filter provided with carbon nanotubes, in which nano-sized metal particles of at least one type of metal are deposited into each carbon nanotube.

2. Description of the Related Art

As is well known to those skilled in the art, human beings, on average, spend at least 80% of their lives indoors. However, room air is contaminated with tobacco smoke, offensive odors, bacteria, or other hazardous materials that adversely affect the human body. Therefore, the demand for purification of room air is increasing, and, accordingly, research into air purification has been increasing.

Typically, an air conditioner or an air cleaner is provided in homes to purify room air. In an air conditioner, a dust collecting filter, which draws in and collects dust present in room air, is essentially mounted therein.

FIG. 1 illustrates a conventional air conditioner 5 equipped with a dust collecting filter 6 and a deodorizing filter 7. As shown in FIG. 1, the air conditioner 5 adsorbs and removes dust, as well as chemical contaminants, for example, $NH_3$, HCl, HF, organic gases, NOx, or SOx.

The conventional deodorizing filter 7 includes activated carbons, carbon fibers, or ion exchange resins, and is chemically formulated to be suitable for use in various desired purposes.

However, adsorption performance of the deodorizing filter 7 is proportional to a surface area of the filter, in which the maximum surface area of commercially available activated carbon, carbon fiber, or ion exchange resin is no more than $10^3$ $m^2/g$.

To ensure that the activated carbons having the maximum surface area of $10^3$ $m^2/g$ remove $NH_3$ gas under conditions of a concentration of 10 ppb and a wind velocity of 0.3 m/s, the filter, including the activated carbons, should be 100 mm thick. Alternatively, the carbon fibers or the ion exchange resins are required to have a filter thickness of 150 mm under the same conditions as those of the activated carbons. Accordingly, the air conditioner is disadvantageous in that it occupies a large volume within the home.

The activated carbons remove odors from air by physical adsorption. However, after adsorption of a predetermined amount or more, the activated carbon filter does not adequately perform adsorption, and odors are not removed from the circulated air.

In the conventional air conditioner 5, the dust collecting filter 6 and the deodorizing filter 7 are separately mounted, thus requiring double mounting costs. Also, it is difficult to maintain and handle the filters.

In areas in which the environment is inferior, such as in various organic materials-generating industrial facilities or during the construction of new buildings, offensive odors that are not removed using a simple filter may cause very serious problems. When humans encounter offensive odors or VOCs (Volatile Organic Compounds: aromatic compounds, alcohols, hydrocarbons, organic acids, ketones, aldehydes, etc.), they may suffer from headaches, as well as disorders of the central nervous system.

Further, when the odors are emitted into atmospheric air, an odor component reacts with nitrogen oxide present in the air to produce ozone ($O_3$) by a photo-oxidation process, thus causing air contamination.

Thus, the VOCs are removed by incineration (heat and catalyst), adsorption recovering organic solvents, absorption, condensation, etc. In addition, new processes, such as membrane separation, ultraviolet oxidation, or corona techniques, are used. However, the above-mentioned processes are difficult to apply to an air conditioner for use in homes in view of cost, volume, and management.

Thus, in homes, VOCs are partially removed by use of ventilators and hoods, as well as by techniques of adsorption using activated carbons and absorbing solution. At present, a filter facilitating adsorption has been widely used.

The adsorption filter is used to efficiently remove low concentrations of VOCs, but does not effectively remove high concentrations of VOCs. Thus, such a filter is disadvantageous in that it needs to be frequently replaced with a new filter due to short service life and high handling cost.

SUMMARY OF THE INVENTION

It is an aspect of the present invention to provide a filter for use in an air conditioner, which includes carbon nanotubes, in which nano-sized metal particles of at least one type of metal are deposited into each carbon nanotube.

It is another aspect of the present invention is to provide a filter for use in an air conditioner, which includes a polymer and carbon nanotubes dispersed in the polymer, in which each carbon nanotube is deposited with at least one type of nano-sized metal particles.

Additional aspects and/or advantages of the invention will be set forth in part in the description which follows and, in part, will be obvious from the description, or may be learned by practice of the invention.

To achieve the above and/or other aspects of the present invention, there is provided a filter for use in an air conditioner including a carbon nanotube, wherein nano-sized metal particles of at least one type of metal are deposited into the carbon nanotube.

The metal particles operate to sterilize, remove odors from air, remove volatile organic compounds from air, or combinations thereof.

The metal particles are selected from the group consisting of silver (Ag), aluminum (Al), copper (Cu), iron (Fe), zinc (Zn), cadmium (Cd), palladium (Pd), rhodium (Rh), and chrome (Cr), which sterilize inflow air; copper (Cu), platinum (Pt), and nickel (Ni), which remove volatile organic compounds from air; titanium oxide ($TiO_2$), vanadium (V), zinc (Zn), and gold (Au), which remove odors from air; or combinations thereof, resulting in the metal particles exhibiting not only a dust collecting operation but also a sterilizing operation.

To achieve the above and/or other aspects of the present invention, there is provided a filter for use in an air conditioner including a polymer; and a carbon nanotube dispersed in the polymer, wherein nano-sized metal particles of at least one type of metal are deposited into the carbon nanotube.

The metal particles operate to sterilize, remove odors from air, remove volatile organic compounds from air, or combinations thereof.

The metal particles are selected from the group consisting of silver (Ag), aluminum (Al), copper (Cu), iron (Fe), zinc (Zn), cadmium (Cd), palladium (Pd), rhodium (Rh), and chrome (Cr), which sterilize inflow air; copper (Cu), platinum (Pt), and nickel (Ni), which remove volatile organic compounds from air; titanium oxide ($TiO_2$), vanadium (V), zinc (Zn), and gold (Au), which remove odors from air; or combinations thereof, resulting in the metal particles exhibiting not only a dust collecting operation but also a sterilizing operation.

To achieve the above and/or other aspects according to the present invention, there is provided an arc-discharge method of forming a filter for an air conditioner using two graphite rods as a cathode and an anode, the method including forming holes in the cathode graphite rod and filling the holes with specific metal powders that operate to provide air purification; creating electrical discharge between the cathode graphite rod and the anode graphite rod, wherein carbon clusters separate from the cathode graphite rod and condense on the anode graphite rod, the condensed carbon clusters containing carbon nanotubes; and dispersing the carbon nanotubes in a polymer.

In addition, to achieve the above and/or other aspects according to the present invention, there is provided a laser vaporization method of forming a filter for an air conditioner, including heating a reacting furnace to about 1,200° C.; irradiating a graphite target with a laser to vaporize the graphite target, wherein the vaporized graphite condenses on a collector and contains carbon nanotubes; and dispersing the carbon nanotubes in a polymer.

These, together with other aspects and/or advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other aspects and advantages of the invention will become apparent and more readily appreciated from the following description of the preferred embodiments, taken in conjunction with the accompanying drawings, of which.

DESCRIPTION OF THE PREFERRED EMBODIMENT

Figure 1:
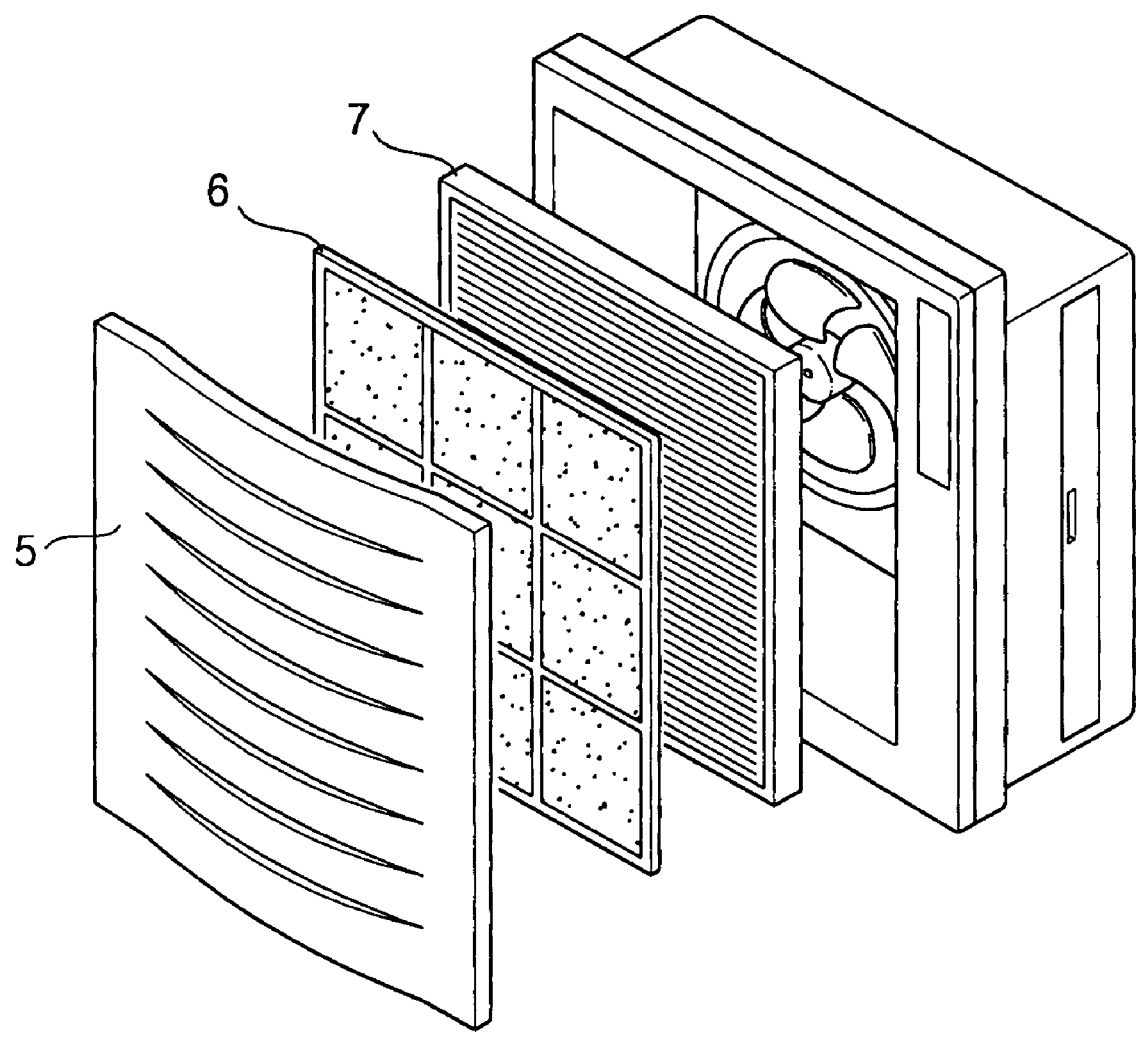
FIG. 1 is a view illustrating a structure of a conventional air conditioner equipped with a dust collecting filter and a deodorizing filter.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

A carbon nanotube (CNT), which is relatively a new material, is a carbon allotrope (carbon is present in large amounts on the earth), in which one carbon atom is bonded with other carbon atoms in a hexagonal honeycomb shape, and the hexagonal honeycomb shapes combine to form a tubular shape. The carbon nanotube has a nanometer-scale, ultra small diameter.

Figure 2A:
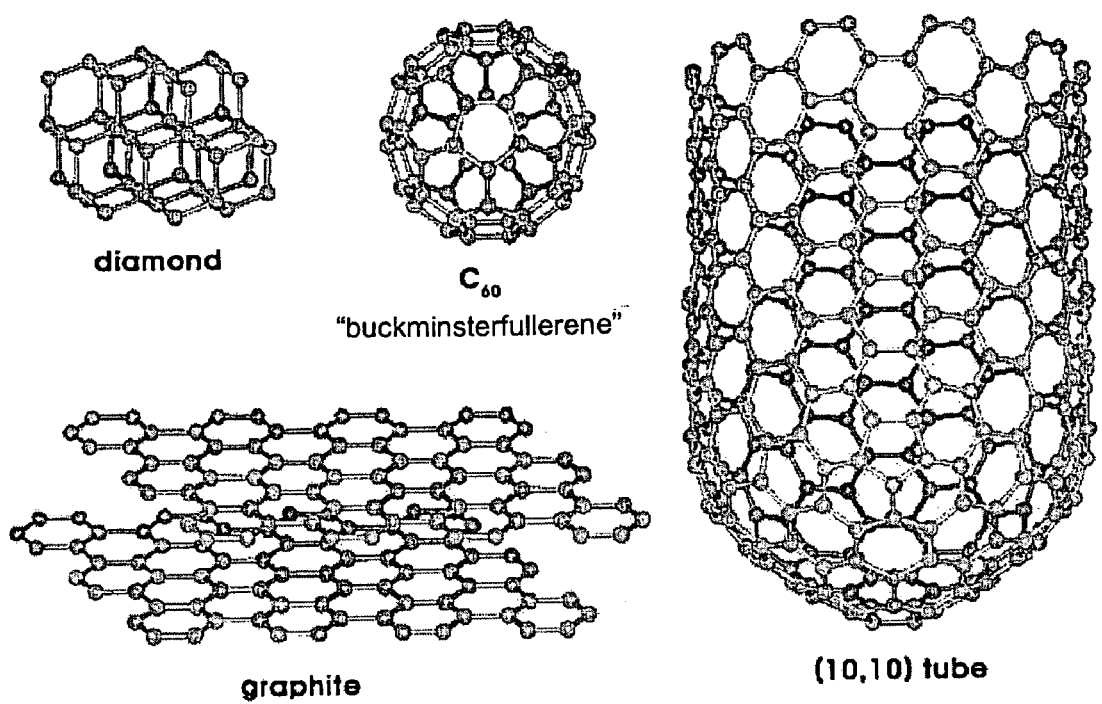
FIG. 2A is a view illustrating a structure of a carbon nanotube.

FIG. 2A illustrates carbon allotropes and a structure of the carbon nanotube. As shown in FIG. 2A, the carbon nanotube is practically in the form of a graphite sheet that is wound in a nanometer-scale diameter, with an $sp^2$ bonding structure.

Figure 2B:
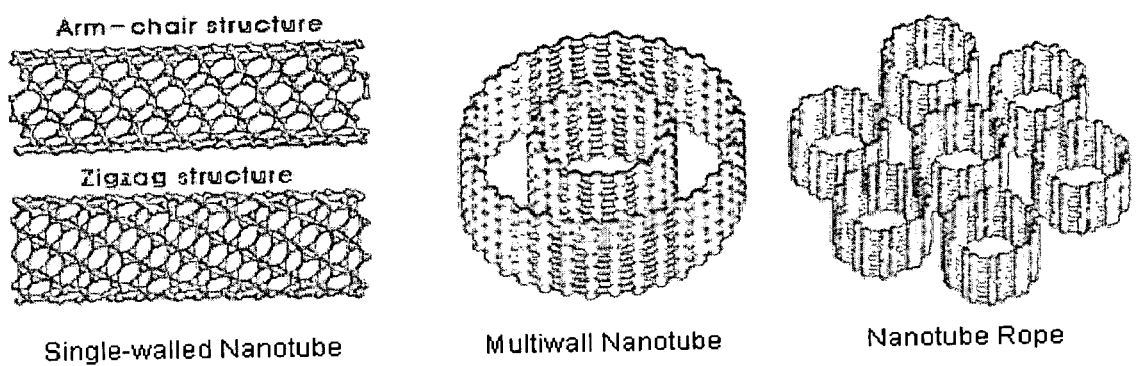
FIG. 2B is a view illustrating types of carbon nanotubes.
Figure 3A:
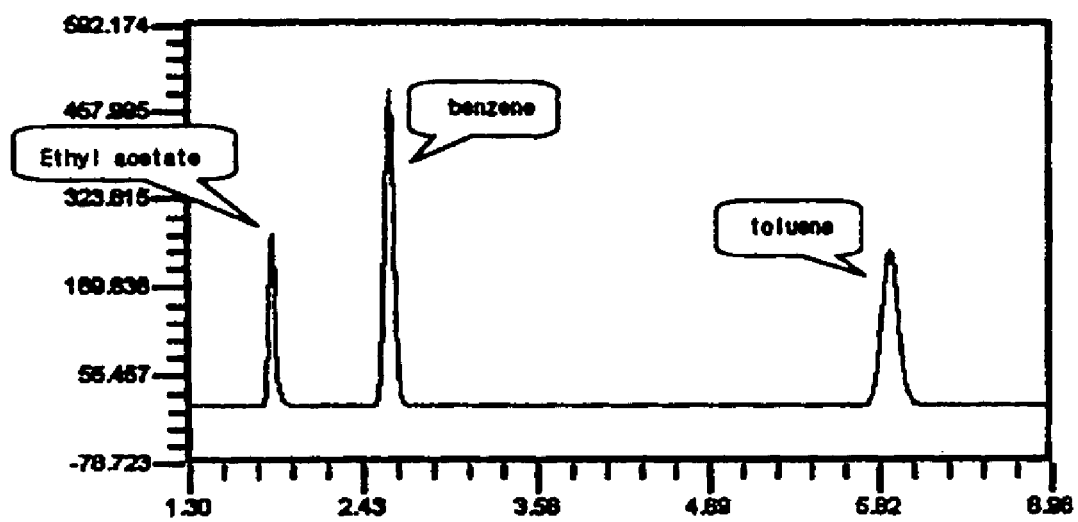
FIGS. 3A through 3D are chromatograms illustrating adsorption performance of a conventional activated carbon filter and a carbon nanotube filter of the present invention.
Figure 3B:
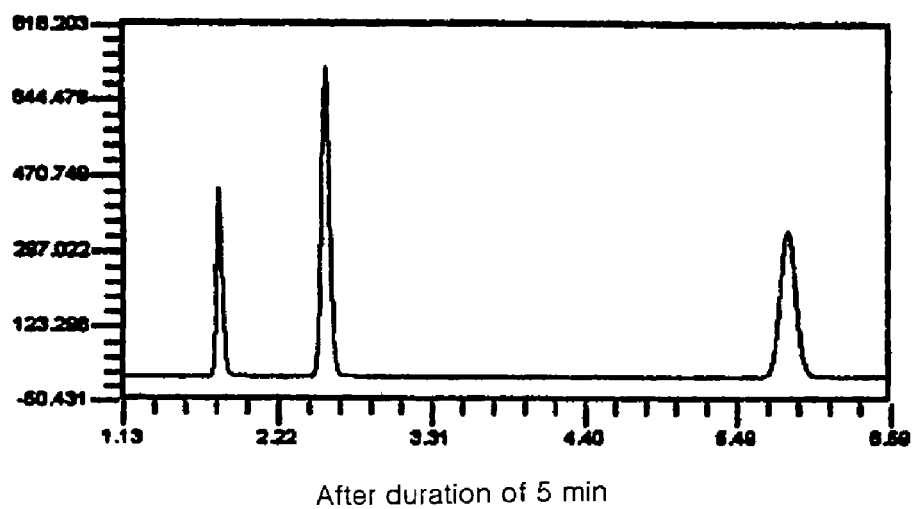
Figure 3B:
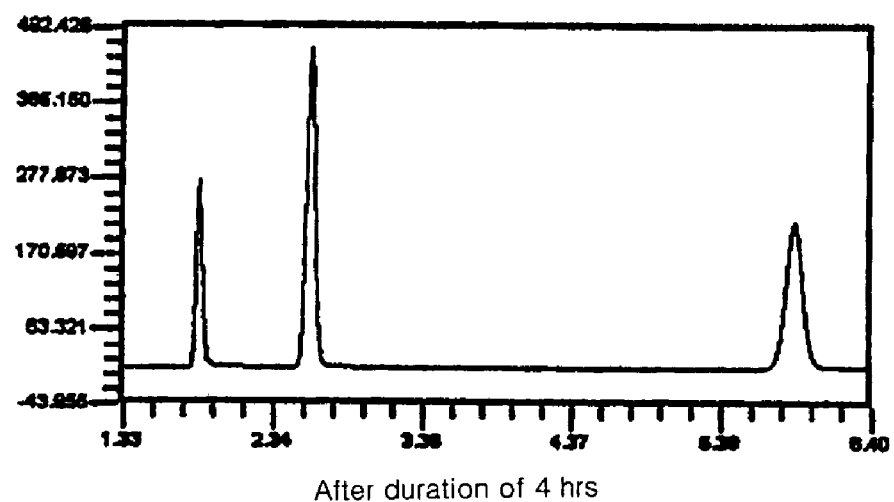
Figure 3C:
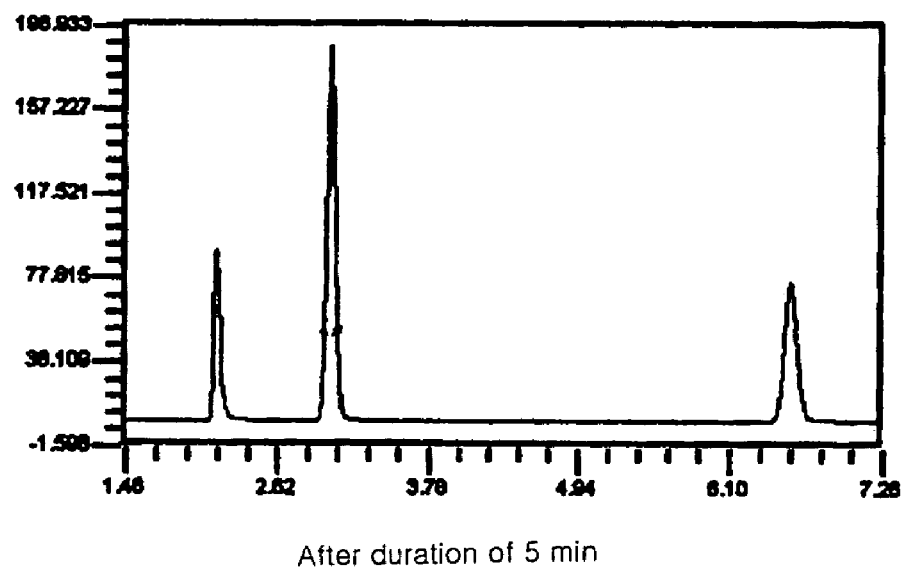
Figure 3C:
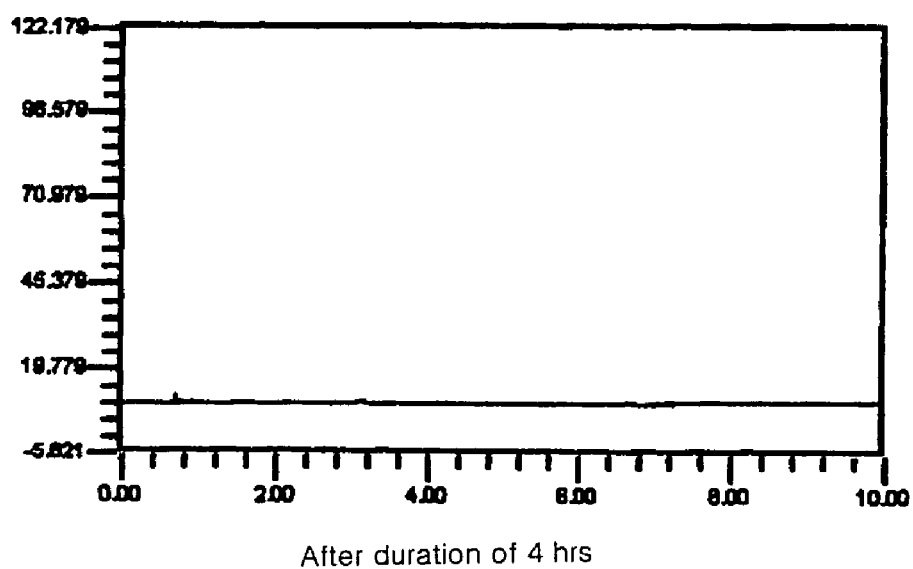
Figure 3D:
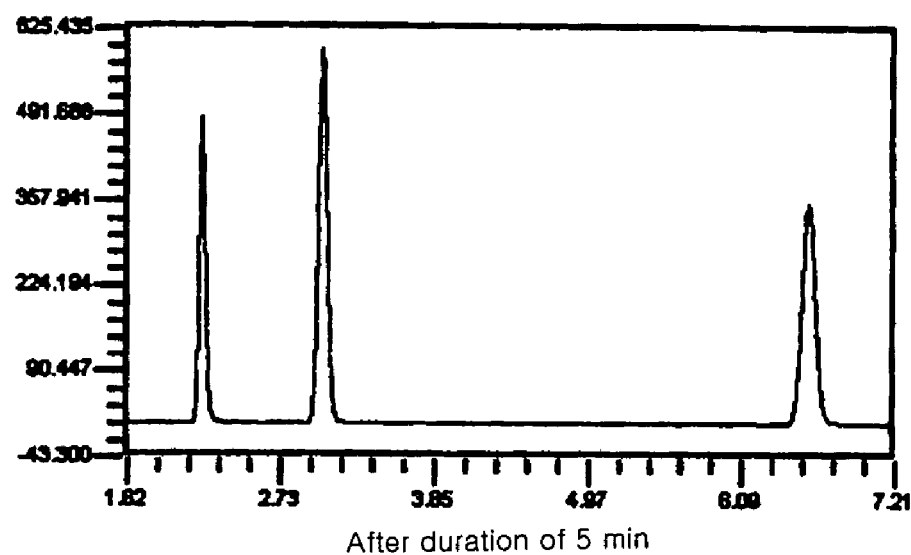
Figure 3D:
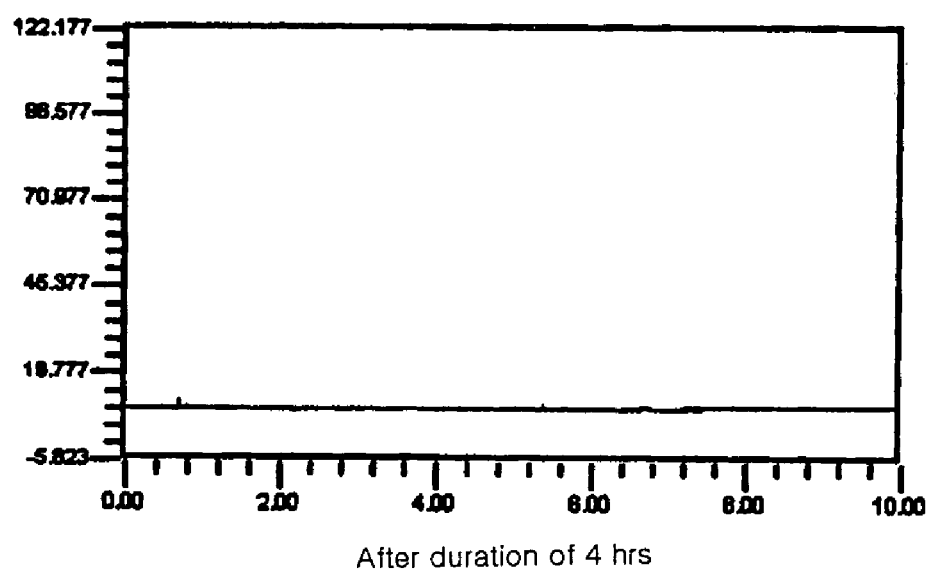

FIG. 2B illustrates different types of carbon nanotubes. As shown in FIG. 2B, the carbon nanotubes are classified into two types according to a bonded number of walls of a nanotube, for example, a single-walled nanotube and a multiwalled nanotube. In addition, a plurality of single-walled nanotubes may be bundled to form a rope nanotube.

The carbon nanotube has a diameter ranging from several nanometers (nm) to several tens of nanometers, and is about 0.1–10 μm long. The carbon nanotube has a surface area of about $10^4$ m²/g, including a hollow core. As a specific surface area of the carbon nanotube increases, adsorption efficiency of a filter including the carbon nanotubes becomes high, whereby a compact filter having a long service life may be easily fabricated.

In the following comparisons of adsorption performance of deodorizing filters according to conventional techniques and the present invention, activated carbons and the carbon nanotubes were used, respectively.

Using an HP5890 series II gas chromatograph, each sample filter was disposed in a column (DB-1: diameter 0.53 m, length 3 m), in which nitrogen gas used as a mobile phase was fed at 2 ml/min. For the blank, benzene, ethyl acetate, and toluene were used in an amount of 3 μl. Benzene, ethyl acetate, and toluene were used in the amount of 20 μl for the activated carbon filter and the carbon nanotube filter.

After a predetermined period of time, the amount of benzene, ethyl acetate, and toluene remaining in a closed room was measured using a flame ionization detector (FID). As such, an inlet of the column was 200° C., the inside thereof was 30° C. (5 min) to 100° C. (10° C./min), and an outlet thereof was 250° C.

FIGS. 3A through 3D illustrate the test results for the performance of the activated carbon filter and the carbon nanotube filter. As shown in FIGS. 3A through 3D, benzene, ethyl acetate, and toluene were not substantially detected after 4 hours in either of the filters.

However, as seen in the following Table, concentrations of benzene, ethyl acetate, and toluene, according to duration of elapsed time, were very different for the activated carbon filter and the carbon nanotube filter.

TABLE (Concentration unit: ppm)

|  | 0 min | 5 min | 30 min | 60 min | 120 min | 240 min |
|---|---|---|---|---|---|---|
| Blank | | | | | | |
| Ethyl acetate | 5347.02 | 5347.02 | 4164.28 | 3620.42 | 3462.19 | 3308.12 |
| Benzene | 5791.42 | 5791.42 | 4561.94 | 3978.54 | 3806.73 | 3649.44 |
| Toluene | 4557 | 4557 | 3593 | 3099 | 3953 | 2756 |
| Carbon Nanotube Filter | | | | | | |
| Ethyl acetate | 40050.04 | 1103.29 | 0 | 0 | 0 | 0 |
| Benzene | 43324.25 | 1592.48 | 56.18 | 5.59 | 5.28 | 0 |
| Toluene | 37109.32 | 744.12 | 19.49 | 0 | 0 | 0 |
| Activated Carbon Filter | | | | | | |
| Ethyl acetate | 40050.04 | 6142.37 | 19.44 | 0 | 0 | 0 |
| Benzene | 43324.25 | 5100.22 | 15.87 | 2.92 | 0 | 0 |
| Toluene | 37109.32 | 3911.71 | 25.81 | 3.69 | 0 | 0 |

When the carbon nanotubes have too high a density, fabrication cost increases. On the other hand, too low a density of the carbon nanotubes results in decreased deodorization performance. Hence, the carbon nanotubes are dispersed in a proper amount, depending on the type of environment in which the filter is to be used, into a polymer, such as polypropylene, to fabricate the carbon nanotube filter.

To remove VOCs from air flowing through the filter, nano-sized metal particles selected from among copper (Cu), platinum (Pt), and nickel (Ni) are deposited into each pore of the carbon nanotubes, thereby enhancing the removal of hazardous materials of the filter. In addition, to sterilize air flowing through the filter, nano-sized metal particles selected from among silver (Ag), aluminum (Al), copper (Cu), iron (Fe), zinc (Zn), cadmium (Cd), palladium (Pd), rhodium (Rh), and chrome (Cr) are deposited into the pores of the carbon nanotubes. Further, nano-sized metal particles of titanium oxide ($TiO_2$), vanadium (V), zinc (Zn), or gold (Au) are used to enhance deodorization properties of the filter.

The nano-sized metal particles are deposited into the carbon nanotubes by arc-discharge or laser vaporization.

Figure 4A:
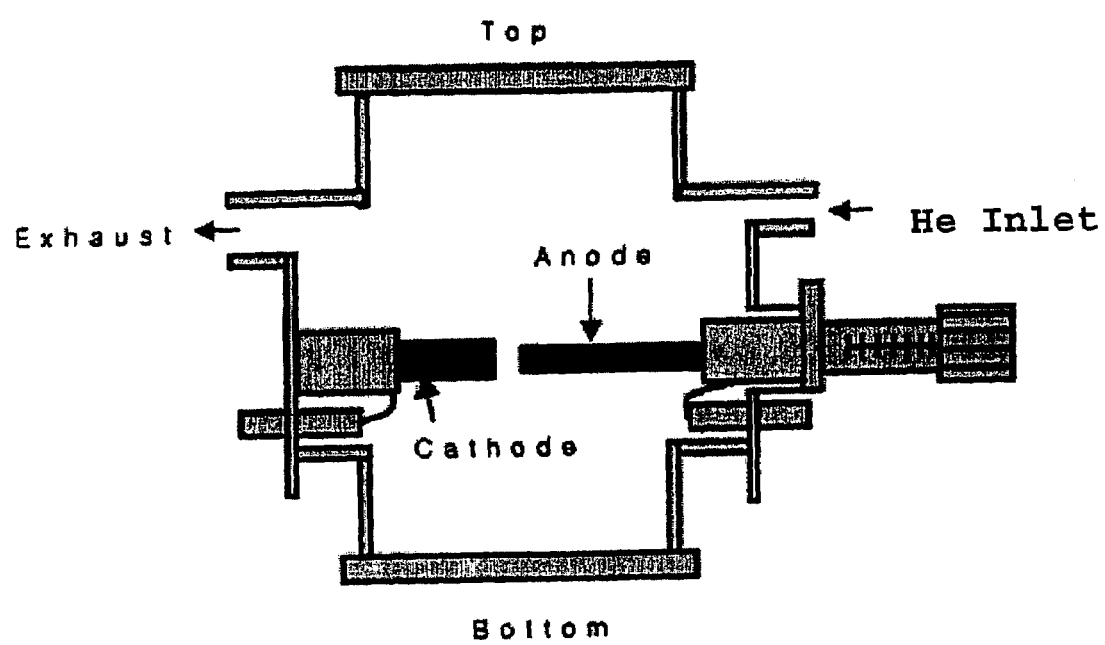
FIG. 4A is a view illustrating a process of depositing metal particles into a carbon nanotube by arc-discharge.

FIG. 4A illustrates an arc-discharge process. As shown in FIG. 4A, when an electrical discharge occurs between two graphite rods used as two electrodes, carbon clusters separate from a cathodic graphite rod and are condensed onto an anodic graphite rod maintained at low temperatures. The graphite condensed on the anode includes carbon nanotubes and carbon nanoparticles. To fabricate a carbon filter according to the present invention, a pure cathodic graphite rod is punched to form holes therein, which are filled with metal powders such as Ag, Cu, Co, Ni, Fe, and Y, and then synthesized, to obtain a single-walled carbon nanotube.

Figure 4B:
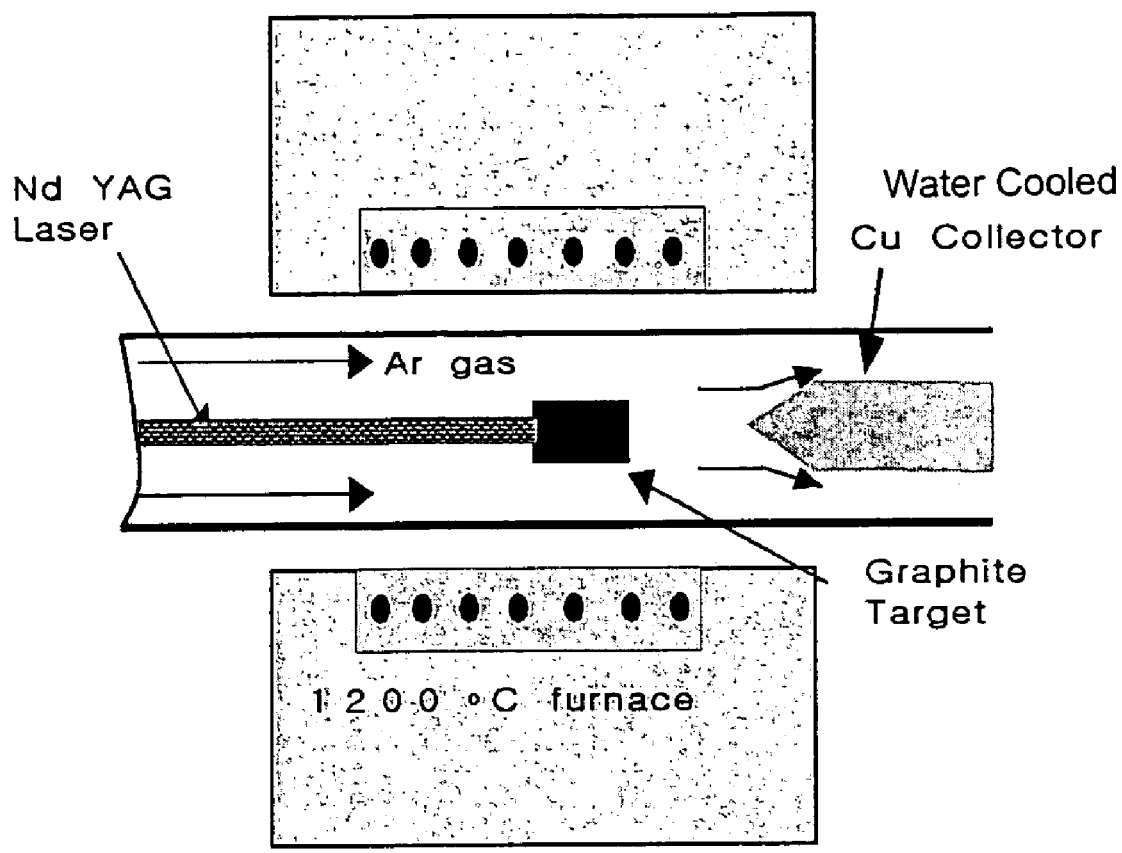
FIG. 4B is a view illustrating a process of depositing metal particles into a carbon nanotube by laser vaporization.

FIG. 4B illustrates a laser vaporization process. As shown in FIG. 4B, after a reacting furnace is heated to about 1200° C., a graphite target in the furnace is irradiated with a laser and vaporized. The vaporized graphite is adsorbed onto a cooled collector. The condensed material obtained includes multiwalled carbon nanotubes and carbon nanoparticles. Helium or argon is used as a delivering gas, and the furnace is maintained under about 500 Torr. When the carbon filter according to the present invention is fabricated, graphite mixed with Ag, Cu, Co, Ni, and Fe is used as the target instead of pure graphite to prepare a uniform, single-walled carbon nanotube.

Figure 5:
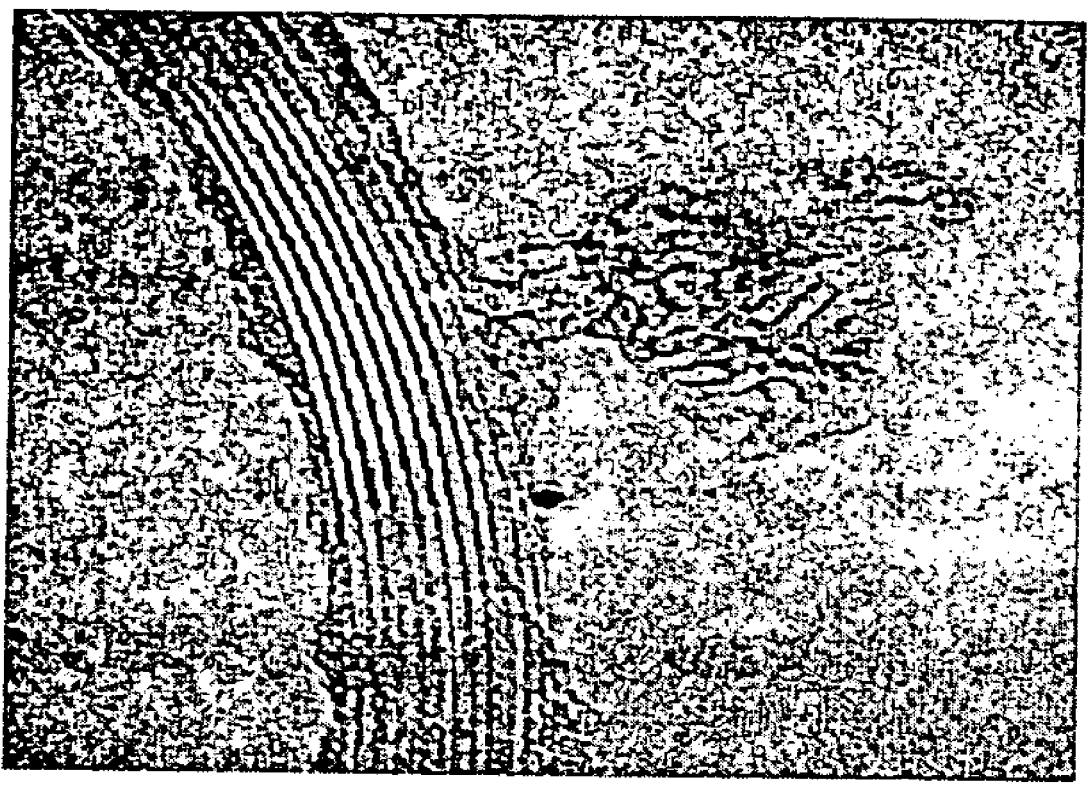
FIG. 5 is a view illustrating a state of metal particles being deposited into the carbon nanotube.

FIG. 5 illustrates the metal particles being deposited into the carbon nanotube by the above arc-discharge process.

As described above, even though fabricated to be ultrathin, the filter using the carbon nanotubes has a large surface area, and exhibits excellent deodorization capabilities. Thus, a compact filter may be provided.

Further, since the carbon nanotubes desorb the adsorbed materials at 300° C. or higher, the filter may be reused through a simple thermal and chemical treatment of the carbon nanotubes. Hence, there is no need to frequently replace the filter with a new filter, which provides economic benefits.

The filter, which is formed with dense layers by use of the carbon nanotubes, may adsorb solid particles such as dust, and, thus, operates as a dust collecting filter. Thus, the carbon nanotube filter may be mounted in the air conditioner alone, without use of an additional dust collecting filter, and is easily handled and maintained.

Depending on the environment in which the air conditioner is used, nickel to remove VOCs, silver to sterilize, titanium oxide to deodorize, or mixtures thereof, are deposited into the pores of the carbon nanotubes, thereby efficiently purifying air without use of an additional treatment apparatus or filter.

Thus, even with having a thin thickness, the filter using the carbon nanotubes according to the present invention efficiently purifies room air and can be recycled through a simple treatment, thus providing economic benefits. Further, because a dust collecting filter is not additionally mounted in the air conditioner, the carbon nanotube filter of the air conditioner may be easily maintained and handled. Also, nano-sized metal particles of at least one type of metal are deposited into the carbon nanotubes, and thus the filter using the carbon nanotubes efficiently removes hazardous materials such as VOCs, even without use of an additional apparatus. Consequently, the air conditioner may be compactly fabricated.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A filter for an air conditioner, comprising:
a carbon nanotube,
wherein nano-sized metal particles of at least one type of metal are deposited into the carbon nanotube.

2. The filter of claim 1, wherein the metal particles sterilize the air.

3. The filter of claim 2, wherein the metal particles are selected from the group consisting of silver (Ag), aluminum (Al), copper (Cu), iron (Fe), zinc (Zn), cadmium (Cd), palladium (Pd), rhodium (Rh), and chrome (Cr).

4. The filter as defined in claim 2, wherein the metal particles remove odors from air.

5. The filter of claim 4, wherein the metal particles are selected from the group consisting of titanium oxide ($TiO_2$), vanadium (V), zinc (Zn), and gold (Au).

6. The filter as defined in claim 2, wherein the metal particles remove volatile organic compounds from air.

7. The filter of claim 6, wherein the metal particles are selected from the group consisting of copper (Cu), platinum (Pt), and nickel (Ni).

8. The filter of claim 6, wherein the nano-sized metal particles that remove odors from the air.

9. The filter of claim 1, wherein the metal particles remove odors from air.

10. The filter of claim 9 wherein the metal particles are selected from the group consisting of titanium oxide ($TiO_2$), vanadium (V), zinc (Zn), and gold (Au).

11. The filter of claim 1, wherein the metal particles remove volatile organic compounds from air.

12. The filter of claim 11, wherein the metal particles are selected from the group consisting of copper (Cu), platinum (Pt), and nickel (Ni).

13. The filter of claim 11, wherein the nano-sized metal particles remove odors from the air.

14. The filter of claim 1, wherein the carbon nanotube forms dense layers that adsorb solid particles.

15. The filter of claim 1, wherein one or more of the metal particles are selected from the group consisting of nickel to remove volatile organic compounds from the air, silver to sterilize the air, and titanium oxide to deodorize the air.

16. An air cleaner comprising the filter according to claim 1.

17. A filter for an air conditioner, comprising:
a polymer; and
a carbon nanotube dispersed in the polymer,
wherein nano-sized metal particles of at least one type of metal are deposited into pores of the carbon nanotube.

18. The filter of claim 17, wherein the metal particles sterilize the air.

19. The filter of claim 18, wherein the metal particles are selected from the group consisting of silver (Ag), aluminum (Al), copper (Cu), iron (Fe), zinc (Zn), cadmium (Cd), palladium (Pd), rhodium (Rh), and chrome (Cr).

20. The filter as defined in claim 18, wherein the metal particles remove odors from air.

21. The filter as defined in claim 18, wherein the metal particles remove volatile organic compounds from air.

22. The filter of claim 12, wherein the metal particles remove odors from air.

23. The filter of claim 22, wherein the metal particles are selected from the group consisting of titanium oxide ($TiO_2$), vanadium (V), zinc (Zn), and gold (Au).

24. The filter of claim 12, wherein the metal particles remove volatile organic compounds from air.

25. The filter of claim 24, wherein the metal particles are selected from the group consisting of copper (Cu), platinum (Pt), and nickel (Ni).

26. The filter of claim 24, wherein the nano-sized metal particles remove odors from the air.

27. An air cleaner comprising the filter according to claim 17.

28. An arc-discharge method of forming a filter for an air conditioner using two graphite rods as a cathode and an anode, the method comprising:
forming holes in the cathode graphite rod and filling the holes with specific metal powders that operate to provide air purification;
creating electrical discharge between the cathode graphite rod and the anode graphite rod, wherein carbon clusters separate from the cathode graphite rod and condense on the anode graphite rod, the condensed carbon clusters containing carbon nanotubes; and
dispersing the carbon nanotubes in a polymer.

29. A laser vaporization method of forming a filter for an air conditioner, comprising:
heating a reacting furnace to about 1,200° C.;
irradiating a graphite target with a laser to vaporize the graphite target, wherein the vaporized graphite condenses on a collector and contains carbon nanotubes and nanoparticles; and
dispersing the carbon nanotubes in a polymer.

30. The laser vaporization method of claim 29, further comprising mixing the graphite target with Ag, Cu, Co, Ni, and Fe to provide a uniform, single-walled carbon nanotube.

31. The laser vaporization method of claim 29, further comprising maintaining a pressure of the reacting furnace at about 500 Torr or less.

* * * * *

UNITED STATES PATENT AND TRADEMARK OFFICE
CERTIFICATE OF CORRECTION

PATENT NO. : 7,074,260 B2
APPLICATION NO. : 10/672064
DATED : July 11, 2006
INVENTOR(S) : Jai-Kwon Lee et al.

It is certified that error appears in the above-identified patent and that said Letters Patent is hereby corrected as shown below:

Column 7, Line 23, after "particles" delete "that".

Column 7, Line 26, after "claim 9" insert --,--.

Signed and Sealed this

Ninth Day of January, 2007

JON W. DUDAS
*Director of the United States Patent and Trademark Office*